June 14, 1966 R. O. STEARNS ET AL 3,256,115
MICROBIOLOGICALLY STABLE, COLD WATER DISPERSABLE GELATINIZED
STARCHY FLOUR AND PROCESS FOR THE PREPARATION THEREOF
Filed April 10, 1963
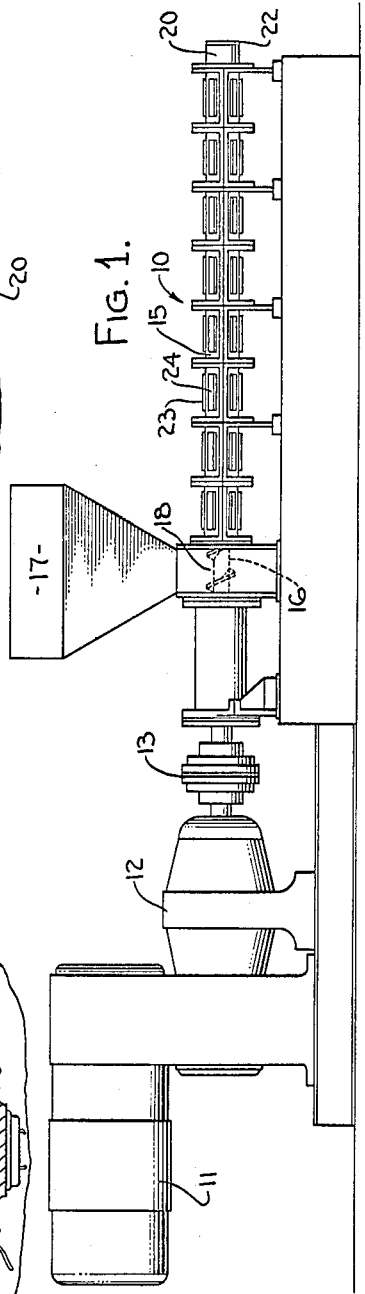
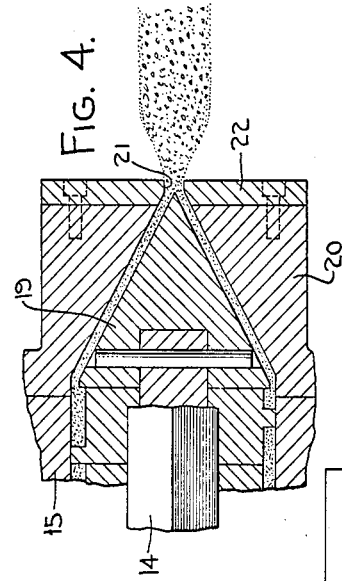
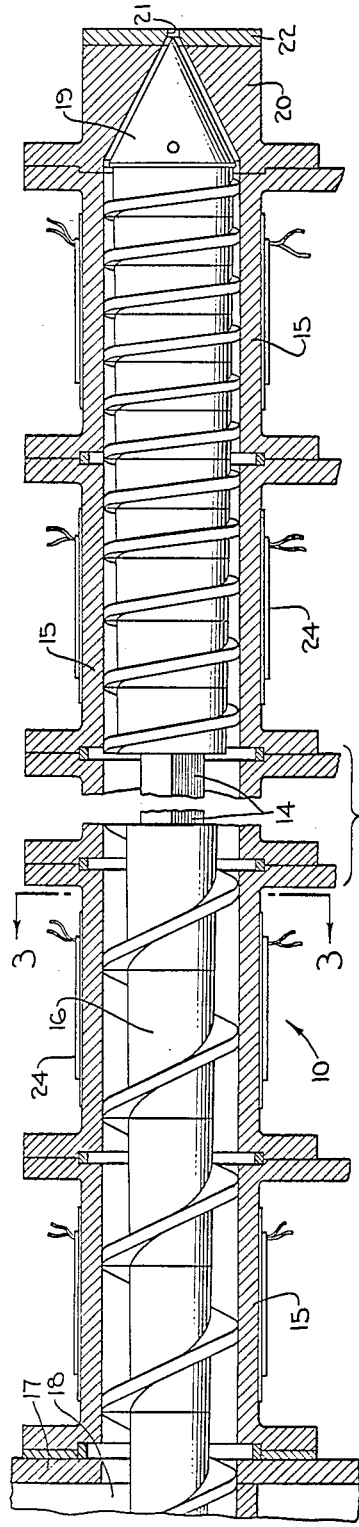
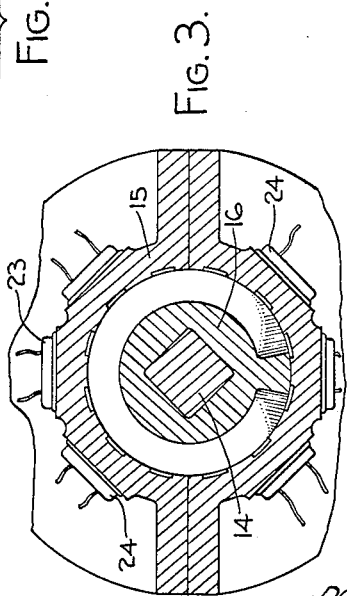
ROBERT O. STEARNS
DONALD J. WEINTRITT
INVENTORS
BY Delman H. Larson
AGENT

United States Patent Office 3,256,115
Patented June 14, 1966

3,256,115
MICROBIOLOGICALLY STABLE, COLD WATER DISPERSABLE GELATINIZED STARCHY FLOUR AND PROCESS FOR THE PREPARATION THEREOF
Robert O. Stearns and Donald J. Weintritt, Houston, Tex., assignors to National Lead Company, New York, N.Y., a corporation of New Jersey
Filed Apr. 10, 1963, Ser. No. 272,103
7 Claims. (Cl. 127—32)

This invention relates to the preparation of a pre-gelatinized starchy material, such as starch or a starchy flour, in order to produce a material dispersible in cold water and resistant to microbiological degradation.

In many fields of use of starch or starchy flour, it is necessary that the starch granules be gelatinized. This is generally accomplished by the action of heat while the material is in a moist state, and indeed, the gelatinization of starch and starchy flours under such conditions is familiar in culinary practice. It has been found that if starch is gelatinized in the presence of water, and subsequently dried, it may then be readily dispersed in cold water without the necessity of bringing the mixture to the initial gelatinized condition of the starch. Starches and starchy flours which have been so pre-gelatinized and dried to give a flaky or powdery product are well-known and widely used for such diverse uses as wall-paper pastes, infant cereals, oil well drilling mud additives, laundry starches, and the like.

Many of the uses of the type of product described require that the aqueous dispersion eventually prepared with the product must remain stable, that is, free from degradation of bacteria, molds, yeasts, and the like, for a considerable length of time, and ideally, indefinitely. Thus, wallpaper paste should remain stable and undeteriorated for several days or weeks after being made, and the same is true for various other glues and pastes made with a starchy base. The problem is particularly acute when the product involved is a pre-gelatinized oil-well drilling mud starch, because in that case the stability must be of indefinite duration or at least stable from 30 to 60 days, and preferably more, because of the conditions of use. The quantities involved in a given usage where oil well drilling muds are involved are normally very large, and premature spoilage of the starch additive may entail the loss of thousands of dollars worth of drilling mud.

An object of the invention is to provide an oil well drilling mud starch which is pre-gelatinized and which is resistant to deterioration under normal conditions of use.

An object of the present invention is to provide a process for making a pre-gelatinized starch which is resistant to microbiological degradation.

Other objects of the invention will appear as the description thereof proceeds.

In the drawings, FIGURE 1 shows an elevational view of a suitable apparatus to produce our novel material.

FIGURE 2 is a vertical section partly in elevation of the extruder portion of FIGURE 1.

FIGURE 3 is a sectional view taken as shown by the arrows in FIGURE 2.

FIGURE 4 is an enlarged detail view of the downstream end of the extruder.

Generally speaking, we pass a moist, raw, starchy flour containing an admixture of between 1% to 5% by weight of paraformaldehyde and between about 1% to 5% by weight of a compound having the following structural formula:

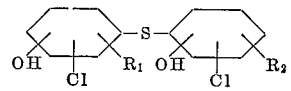

where $R_1$ and $R_2$ are chosen from the group consisting of Cl and H, through a decreasing pitch extruder at a pressure of at least 200 lbs. per square inch and at a temperature of at least 260° F., allowing the hot extruded starchy flour to expand downstream of said extruder and then drying and grinding the product so obtained.

We use the term "starch" and "starchy flour" interchangeably, and mean to include the known and especially the commercially used starches and starchy flours, particularly those which are rich in starch proper. These include corn (maize), both ordinary and waxy; sorghum, both ordinary and waxy; potato; rice; tapioca; Brazilian arrowroot; St. Vincent's arrowroot; and less frequently encountered starches such as yuca, manioc, sago, barley, and the like. As stated, these may be used in their flour form or in the relatively purified starch form.

The production of the starchy flour in accordance with the invention may be better understood with reference to the drawings which show a suitable apparatus. Referring to FIGURE 1, this shows an extruder 10 which is driven by a motor 11 through suitable reduction gearing 12 and a flexible coupling 13.

The extruder 10 comprises a generally cylindrical housing made up of flanged sections, of which 15 is typical. Within the housing, the square shaft 14 carries a worm screw, which is also sectional, 16 being a typical section. It will be observed from FIGURE 2 that, whereas the outside diameter of the worm is constant, matching the inside diameter of the housing, the stock or shaft portion of the screw is of relatively small diameter at the input or feed end, which is at the left in FIGURE 2, and tapers to a relatively large diameter at the output or right end. The free space between the stock of the worm screw and inner wall of the housing thus becomes smaller as one goes from left to right in the section shown in FIGURE 2.

At the same time, it will be observed that the pitch of the screw decreases in going from left to right, that is, from the input to the output end. When a starchy flour is put into hopper 17, it falls down onto the worm screw at the point marked 18 at the extreme left of FIGURE 2, and, when the screw is rotating, it is carried along by the screw from left to right at the same time it is compressed.

The worm screw is terminated on its right, or output end, by a conical cap 19, which fits with small clearance inside the final, or extruding section 20 of the housing. An opening for the material is provided by an aperture 21 in a die plate 22.

The several sections 15 of the housing are each fitted with heating means, preferably electric heaters, of which 23 and 24 are typical. While the extrusion process itself causes the material being worked upon to rise in temperature somewhat, it is not enough to maintain temperature in the range required by the invention. The provision of a multiplicity of electric heaters as shown makes very precise temperature control possible.

An unexpected result of passing a starchy flour through an extruder in the fashion described, whether the chemical preservatives hereinabove recited are present or not, is that the product obtained is thin boiling, that is, when made into aqueous suspension, the viscosity of the suspension is much less than would be obtained from an equal concentration of the original starchy flour gelatinized by ordinary cooking. The alkaline fluidity of starchy flours in accordance with the invention will range from 20 to 70 as determined by the method which is well standardized in the corn-wet milling industry. The quantitative values recited hereinabove have been determined essentially in accordance with the method set forth on page 133 of the book "Chemistry and Industry of Starch," second edition, by R. W. Kerr, New York, 1950. Five grams of the starchy material to be processed (dry basis) are stirred for one minute with 55 cc. of water, whereupon 45 cc. of two normal caustic soda is added, followed by three minutes stirring. The mixture is then allowed to stand for 27 minutes at 25° F., and is then poured into a standard fluidity funnel, which is a 4 inch diameter 60° glass laboratory funnel with the glass stem cut off and replaced by a short glass tip adjusted so that 100 cc. of water will flow out in 70 seconds. The alkaline fluidity is the volume in cc. of a solution of the starchy material prepared as just described which will flow out in 70 seconds. Unmodified starch will scarcely flow out at all and will have a fluidity of the order of 1 or 2.

The paraformaldehyde which we use in our invention is the ordinary paraformaldehyde of commerce. The second compound, the structural formula of which has already been given, may also be described in chemical terms as the following: (hydroxy, mono-, or dichlorophenyl) (hydroxy, mono- or dichlorophenyl) sulphide.

We especially prefer that compound in accordance with the above description and more particularly in accordance with the structural formula given earlier in which the hydroxy groups are in the 2 position, the chlorine atoms are both in the 4 position, and the $R_1$ and $R_2$ are both chlorine in the 6 position. This preferred compound which is commercially available may thus be named as follows: bis(2-hydroxy 3,5-dichlorophenyl) sulfide.

We have found that both the formaldehyde and the chlorinated bis-phenol sulfide should be present each within the range of 1% to 5% by weight of the dry starchy flour in order to be effective in accordance with the invention. The preferred and indeed the best admixture, considering all of the factors involved, is 3% by weight of paraformaldehyde and 3% by weight of the chlorinated bis-phenol sulfide, and more particularly, of bis (2-hydroxy 3,5-dichlorophenyl) sulfide.

The processing of the starchy flour in the extruder in accordance with this aspect of the invention may now be described in detail. The particle size of the starchy material is not especially critical; it should merely be of convenient size to fall through the hopper and be picked up by the rotating screw. Even when the starting material is maize, the whole grains may be used in that state. They may also be cracked and degerminated, if desired. If a dry-milled corn flour is used to obtain a somewhat lower protein content, then it will of course already be in coarse powder form. Corn (maize) starch will necessarily be quite fine, as will the pure starches generally. Other grains such as rice may likewise be fed to the extruder whole, or cracked, or ground. Potato starch and potato flour are especially satisfactory for drilling mud use.

The moisture content of the starting material should be at least 15% by weight, to allow sufficient water for gelatinizing and cooking. The best moisture content is approximately 20%. Moisture is expressed herein as the percentage by weight of the whole material lost upon overnight drying at 105° C. Where the supply of raw material is quite dry, it is well to add sufficient water to bring the moisture up to the figures just given, and allow some time for penetration of the added water into the interior of the grains or granules.

The paraformaldehyde and the chlorinated bis-phenol sulfide are generally obtained in dry, powdered form and may most conveniently be added to the hopper along with the starchy flour. Of course, where desired, these two chemical additives may be admixed with the starchy flour some time prior to passing through the extruder.

The gelatinization process is simple and fast; the starchy material is fed into the hopper, taken up by the screw and simultaneously compressed, sheared, kneaded, and the like by the intensive mechanical action of the extruder, and of course heated. The material reaching the final section 10 of the extruder will be at a temperature of between 260° F. and 330° F., and at a pressure of at least 200 p.s.i. (pounds per square inch). As it exits from the die plate, the pressure is suddenly released to atmospheric, and a flash expansion of the superheated water in the material leads to a considerable enlargement in cross-sectional diameter, as indicated in FIGURE 4. In a very short time the extruded, puffy mass will have dried and cooled enough to be relatively solid.

Depending upon the factors of moisture content of feed, extrusion temperature, and kind and nature of the starchy material, and also of course upon the ambient humidity and temperature, the extruded mass may be allowed to air dry or it may be artificially dried by suitable ordinary chemical process equipment, and then ground, as in a hammer mill, to produce a product in convenient form for treatment of a mud fluid, or for wall-paper paste or whatever end use is desired.

As has been mentioned, an especially important use for the degradation resistant pre-gelatinized starchy flours of the present invention is in connection with rotary drilling mud fluids. In the drilling of wells in search of oil and gas by the rotary method, a drilling fluid or mud is circulated downwardly through a continuous string of drill pipe, issuing at the bit through ports provided therein. The drilling fluid then circulates upwardly through the cylinder of the annular cross-section formed between the exterior of the drill pipe, and a more or less corresponding amount flows out at the top of the well, exterior to the drill pipe. The outflowing mud may be passed through ditches, screens and the like to remove impurities and may be conditioned by various chemical and mechanical treatments so as to keep it suitable for its purpose, and it is then taken up by mud pumps and recirculated back down into the drill pipe. The circulation of the drilling fluid is substantially continuous during a given session of drilling. When the drill pipe is withdrawn from the hole in order to change bits and the like, the drilling fluid remains in the hole.

In nearly all cases, wells drilled for oil and gas penetrate sedimentary formations which will expose strata of varying degrees of porosity and permeability to the well bore. Drilling fluids of the type under consideration here contain finely divided mineral matter, which in any case will have been derived from the process of drilling up formation in order to make the well bore; and in most cases additionally will contain such material as a result of deliberate addition of clays and other finely divided minerals such as limestone, barite, hematite, and the like.

Now a fundamental difficulty which is almost univerally encountered is that the drilling fluid or mud undergoes filtration at the walls of the bore hole opposite porous formations. In the ordinary case, the filtration consists of the liquid proper of the drilling fluid leaving the bore hole and entering the porous formation or stratum, leaving behind as a filter cake on the wall of the bore hole a sludge of the solid matter of the drilling fluid together with some of the liquid. This tends to take place for the reason that the drilling fluid is always maintained, or at least when good drilling practice is carried out, should be maintained, so that it exerts a hydrostatic pressure against porous formations which is somewhat greater than the pressure of any fluids contained in the formation. If this is not done, then high pressure fluids will intrude into the bore hole and may lead to the loss of the well, particularly when the fluid in question is gaseous.

It is necessary to maintain the mud in such a condition that the formation of a filter cake as described is kept at an absolute minimum. Where the drilling mud is of a water-base type it is common to admix therewith a water-soluble or water-dispersible hydrophilic colloid, so that the colloid disperses therein and is made to interact therewith. Natural gums, such as karaya, have been used, and also starches and starchy flours. These are subject to microbiological degradation, unless suitably treated, chiefly by bacteria, yeasts, and molds, so that there is some usage of completely synthetic polymers, such as sodium carboxymethylcellulose and sodium polyacrylate. Such synthetic polymers appear to be relatively resistant to degradation, so that they find a use in drilling muds even in spite of their much higher cost when compared with starches, since they can be added to otherwise untreated mud. However, the starchy flour products made in accordance with our invention are quite as resistant to degradation when incorporated with drilling muds as are the much more expensive synthetic polymers of the type just described. Their use therefore is a significant advance in drilling mud technology. They may be employed in the same range of proportions as is common with pre-gelatinized starch and starchy flours. This is the range of ½ lb. to 25 lbs. per barrel (42 U.S. gallons) of the mud which is treated. The fluid loss of the mud so treated will be reduced quite as well and in most cases even better than by the employment of the same weight of starch or starchy flour which does not contain the two chemical additives already disclosed. As already mentioned, the starchy flours processed through the extruder in accordance with our invention as disclosed will have an alkaline fluidity within the range of 20 to 70.

Some examples of proceeding in accordance with the invention will now be given:

*Example 1.*—Potato starch from Colorado, which had a moisture content of 17%, was treated with water to give a moisture content of 25% and 2% by weight of paraformaldehyde and 3% by weight of bis (2-hydroxy, 3,5-dichlorophenyl) sulfide were added. This was then passed through an extruder as shown in the drawings with a barrel length of 72 inches and a compression ratio of 4.5 to 1, with ½ inch orifice, at 260° F. and 500 lbs. per square inch, measured just upstream from the orifice. The extruded material was allowed to air dry, and was then ground in a hammer mill. It readily dispersed in water at room temperature, and was usable as a paper paste, without further treatment. Water suspensions were stable for at least a 3 week duration of the observation. When added to a drilling fluid which consisted of water, a natural shale, some bentonite, and some ferrochrome lignosulfonate, an addition of 3.5 lbs. per barrel gave a fluid loss reduction from 56 cc. to 6 cc. This mud was stable, without evidence of deterioration, for the three week duration of the test.

*Example 2.*—Corn (maize) starch and tapioca starch were separately processed as set forth in Example 1 hereinabove, except that the moisture content was adjusted to 19% for the corn starch and 23% for the tapioca starch, prior to passing the mixture through the extruder; and also except that the percentage of paraformaldehyde was 3% in each case. Excellent products were obtained, which exhibited very good stability when tested in a mud consisting of approximately 4% attapulgite dispersed in a 10% aqueous sodium chloride solution, and saturated with gypsum. The filter loss of the test mud was well over 50 ml. A.P.I. before the addition of the starches processed in accordance with the invention. When the latter were added at a concentration of 3.5 lbs. per barrel, the filter loss was reduced as follows:

|  | Corn Starch | Tapioca Starch |
| --- | --- | --- |
| Initial filtrate, API | 12.5 | 13.0 |
| Filtrate after 16 hrs. rolling at 150° F | 12.8 | 13.0 |

The viscosities of the treated muds were both quite low, and satisfactorily pumpable.

*Example 3.*—Potato starch was processed in accordance with the invention in a large, production-size extruder essentially similar to that shown in the drawings; the worm diameter was 8 inches, and the extruder proper had a length of 11 feet, 10 inches. The downstream sections of the extruder were maintained at a temperature between 260° F. and 305° F., and the pressure varied between 400 and 800 p.s.i. The throughput rate was 1200 lbs. per hour on a continuous basis; the moisture content of the feed was 24.5%, and that of the product was 12%. The worm was rotated at 108 r.p.m.

When the product was tested in the mud described in Example 2, at the same concentration, the following results were obtained:

Initial filtrate, API _____ 11.6
Fltrate after 16 hrs. rolling at 150° F. _____ 9.9

While our invention has been illustrated in terms of and with the aid of specific examples, it will be understood that various modifications and changes may be made in proportions, details of procedure, and the like, all within the broad scope of the invention as defined in claims that follow.

Having described the invention, we claim:

1. A microbiologically stable, cold water dispersible gelatinized starchy flour consisting essentially of a starchy flour together with from 1% to 5% by weight of paraformaldehyde and from 1% to 5% by weight of a compound having the following structural formula:

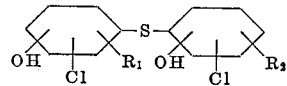

where $R_1$ and $R_2$ are chosen from the group consisting of Cl and H, said product having been formed by extruding said starchy flour in a moist state together with said paraformaldehyde and said compound at a pressure of at least 200 lbs. per square inch and at a temperature of at least 260° F., allowing the hot extruded starchy flour to expand at atmospheric pressure after said extrusion, and drying and grinding the product so formed.

2. The product in accordance with claim 1 wherein said compound is bis (2-hydroxy, 3,5-dichlorophenyl) sulfide.

3. The product in accordance with claim 1 in which said paraformaldehyde and said compound are each present at a concentration of about 3% by weight.

4. The process of producing a starchy flour which comprises combining a moist, raw starchy flour containing from between 1% to 5% by weight of said dry starchy flour of paraformaldehyde together with from 1% to 5% by weight of a compound having the following structural formula:

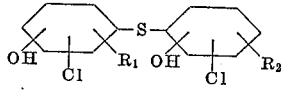

where $R_1$ and $R_2$ are chosen from the group consisting of Cl and H, and extruding said flour at a pressure of at least 200 lbs. per square inch and at a temperature of at least 260° F., allowing the hot extruded starchy flour to expand at atmospheric pressure after said extrusion, and drying the product so formed.

5. The process in accordance with claim 4 wherein said compound is bis (2-hydroxy, 3,5-dichlorophenyl) sulfide.

6. The process in accordance with claim 4 wherein said paraformaldehyde and said compound are each present in the proportion of about 3% by weight.

7. The process in accordance with claim 4 wherein said fluid is potato starch; said compound is bis (2-hydroxy, 3,5-dichlorophenyl) sulfide; and said paraformaldehyde and said compound are each present in the concentration of about 3%.

References Cited by the Examiner
UNITED STATES PATENTS

| | | | |
|---|---|---|---|
| 2,177,658 | 10/1939 | Kimble et al. | 264—176 |
| 2,400,820 | 5/1946 | Glarum et al. | 127—32 |
| 2,417,307 | 3/1947 | Larsen | 252—8.5 |
| 2,900,335 | 8/1959 | Bravos et al. | 252—8.5 |
| 2,908,597 | 10/1959 | Owen | 127—33 X |
| 2,974,069 | 3/1961 | Nieuwenhuyzen | 127—32 |
| 3,090,994 | 5/1963 | Stenger | 264—176 |

CHARLES B. PARKER, *Primary Examiner.*

JULIUS GREENWALD, *Examiner.*